(12) United States Patent
Röer

(10) Patent No.: US 11,764,625 B2
(45) Date of Patent: Sep. 19, 2023

(54) SEGMENT SHEET FOR A STATOR LAMINATION STACK, STATOR LAMINATION STACK, AND GENERATOR AND WIND TURBINE COMPRISING SAME

(71) Applicant: Wobben Properties GmbH, Aurich (DE)

(72) Inventor: Jochen Röer, Ganderkesee (DE)

(73) Assignee: Wobben Properties GmbH, Aurich (DE)

( * ) Notice: Subject to any disclaimer, the term of this patent is extended or adjusted under 35 U.S.C. 154(b) by 173 days.

(21) Appl. No.: 17/292,231

(22) PCT Filed: Nov. 11, 2019

(86) PCT No.: PCT/EP2019/080872
§ 371 (c)(1),
(2) Date: May 7, 2021

(87) PCT Pub. No.: WO2020/094884
PCT Pub. Date: May 14, 2020

(65) Prior Publication Data
US 2021/0408847 A1 Dec. 30, 2021

(30) Foreign Application Priority Data
Nov. 9, 2018 (DE) ...................... 10 2018 128 129.3

(51) Int. Cl.
*H02K 1/14* (2006.01)
*H02K 1/18* (2006.01)
(Continued)

(52) U.S. Cl.
CPC ............... *H02K 1/148* (2013.01); *F03D 9/25* (2016.05); *F03D 13/20* (2016.05); *F03D 15/20* (2016.05);
(Continued)

(58) Field of Classification Search
CPC .......... H02K 1/148; H02K 1/17; H02K 21/26; H02K 23/04
(Continued)

(56) References Cited

U.S. PATENT DOCUMENTS

| 4,634,909 A | 1/1987 | Brem |
| 8,981,609 B2 | 3/2015 | Joeckel |

(Continued)

FOREIGN PATENT DOCUMENTS

| CA | 2808778 A1 * | 2/2012 | ............. H02K 1/185 |
| CN | 103051077 A | 4/2013 | |

(Continued)

*Primary Examiner* — Jose A Gonzalez Quinones
(74) *Attorney, Agent, or Firm* — SEED INTELLECTUAL PROPERTY LAW GROUP LLP

(57) ABSTRACT

A segment sheet for a stator lamination stack of a generator of a wind turbine, wherein the segment sheet has the shape of a ring segment, having a first radial section, in which recesses are provided for receiving a stator winding, having a second radial section, which is arranged radially adjacent to the first section and which forms a segment of a magnetic yoke of the generator, and having a third radial section, which is arranged radially adjacent to the second section. The proposal is that the third radial section has at least two recesses arranged in an azimuthally spaced manner, which are designed for a positive connection to profiled strips arranged on a stator support ring.

18 Claims, 12 Drawing Sheets

(51) Int. Cl.
   *H02K 7/18*   (2006.01)
   *H02K 1/12*   (2006.01)
   *H02K 1/17*   (2006.01)
   *H02K 21/26*  (2006.01)
   *H02K 23/04*  (2006.01)
   *F03D 9/25*   (2016.01)
   *F03D 13/20*  (2016.01)
   *F03D 15/20*  (2016.01)

(52) U.S. Cl.
   CPC ............... *H02K 1/12* (2013.01); *H02K 1/17* (2013.01); *H02K 1/18* (2013.01); *H02K 1/185* (2013.01); *H02K 7/1838* (2013.01); *H02K 21/26* (2013.01); *H02K 23/04* (2013.01); *F05B 2220/706* (2013.01); *F05B 2240/14* (2013.01); *F05B 2240/2212* (2013.01); *F05B 2240/912* (2013.01); *H02K 2201/15* (2013.01)

(58) Field of Classification Search
   USPC .... 310/216.086, 216.114, 216.125, 216.129, 310/216.131, 154.01
   See application file for complete search history.

(56) References Cited

U.S. PATENT DOCUMENTS

| | | | |
|---|---|---|---|
| 2010/0102650 A1* | 4/2010 | Eriksen | H02K 9/197 310/64 |
| 2012/0074798 A1* | 3/2012 | Bywaters | H02K 16/04 310/216.113 |
| 2012/0133145 A1 | 5/2012 | Longtin et al. | |
| 2015/0236553 A1* | 8/2015 | Pabst | H02K 1/185 310/216.126 |

FOREIGN PATENT DOCUMENTS

| | | | | |
|---|---|---|---|---|
| CN | 204615540 U | | 9/2015 | |
| DE | 2557391 A | * | 6/1977 | ............ H02K 1/185 |
| DE | 2557391 A1 | | 6/1977 | |
| DE | 102008063783 A1 | * | 6/2010 | ............ F03D 15/20 |
| DE | 102008063783 A1 | | 6/2010 | |
| EP | 0175075 A1 | | 3/1986 | |
| EP | 2182612 A1 | | 5/2010 | |
| EP | 2385609 A1 | | 11/2011 | |
| JP | S5689636 U | | 7/1981 | |
| JP | H0614482 A | | 1/1994 | |
| WO | 2012/040535 A2 | | 3/2012 | |

* cited by examiner

SEGMENT SHEET FOR A STATOR LAMINATION STACK, STATOR LAMINATION STACK, AND GENERATOR AND WIND TURBINE COMPRISING SAME

BACKGROUND

Technical Field

The invention relates to a segment sheet for a stator lamination stack of a generator of a wind turbine. The invention further relates to a stator lamination stack for a generator of a wind turbine, as well as a generator of a wind turbine and a wind turbine.

Description of the Related Art

Wind turbines are widely known. They are used to convert wind energy into electrical energy by means of an electric generator. The core element for this task in wind turbines is the generator. The generator has a generator stator and a generator rotor rotating relative thereto, also referred to as a "runner". The present application relates both to wind turbines and generators with internal rotors and to those with external rotors, by which it is understood that, in the case of an internal rotor, the generator rotor rotates within an annular stator while, in the case of an external rotor, the generator rotor rotates around the outside of the stator.

The generator stator has a stator winding, in which an electrical voltage is induced by means of the rotating generator rotor. The stator winding is accommodated in grooves, which in turn are provided in the stator, for example in a stator support ring.

One widely known practice is to form the component which accommodates the stator winding from one or more stator lamination stacks. These stator lamination stacks are formed by segment sheets, which are placed against one another to form rings and stacked one on top of the other to form the lamination stacks.

To support the stator lamination stacks, a support structure has always been provided on the stator, generally as a welded or cast assembly, which stiffens the stator lamination stacks. The support structure comprises a stator support ring, on which "lower" pressure plate segments are arranged to form a ring on the machine carrier side, and "upper" pressure plate segments are arranged to form a ring on the drive side, i.e., on a side facing the rotor, between which the stator lamination stack is formed.

To form the stator lamination stack, the individual segment sheets were threaded onto nesting rods, which are arranged on the lower pressure plate segments. Threading was carried out simultaneously on three adjacent nesting rods. After threading, the upper pressure plate segments were arranged on the stator lamination stack formed. The stator lamination stack was clamped by means of stud bolts, and the lower and upper pressure plate segments were welded to the stator support ring. The threading of the segment sheets is time-consuming, and the welding processes for securing the lower and upper pressure plate segments entail the risk that welding pimples are overlooked in a groove accommodating the stator winding, as a result of which a short to ground can occur. Moreover, the two-sided welding of the pressure plate segments to the stator support ring hinders settling compensation of the stator lamination stack.

In the priority German application, the German Patent and Trademark Office searched the following document: DE 10 2008 063 783 A1.

BRIEF SUMMARY

One or more embodiments are directed to reducing the assembly outlay for generators of wind turbines.

One embodiment is directed to a segment sheet for a stator lamination stack of a generator of a wind turbine, wherein the segment sheet has the shape of a ring segment, having a first radial section, in which recesses are provided for receiving a stator winding, having a second radial section, which is arranged radially adjacent to the first section, and which forms a segment of a magnetic yoke of the generator, and having a third radial section, which is arranged radially adjacent to the second section.

Proposed is a segment sheet. In particular, the segment sheet has a third radial section having at least two recesses arranged in an azimuthally spaced manner, which are designed for a positive connection to profiled strips arranged on a stator support ring.

According to the invention, a radial section is understood to mean a section of the segment sheet that has an extent in the radial direction. Azimuthal spacing is understood to mean the spacing in the circumferential direction or direction of rotation of the generator which contains the segment sheets. The at least two recesses are formed in the segment sheet with a contour which is complementary to the contour of the profiled strips. The positive connection of the segment sheets to profiled strips arranged on the stator support ring permits a clearly simplified insertion process for their mounting. The complicated and time-consuming simultaneous threading onto the nesting rods envisaged according to the prior art can now be dispensed with. A further advantage of the positive connection of the segment sheets to the strips on the stator support ring is that, by means of an angled configuration of the strips, an arrow shape can be achieved in the stator lamination stack without adversely affecting mountability. For this purpose, the strips can have two sections arranged at an angle to one another when viewed in the axial direction of the stator support ring. Furthermore, it is possible, by means of the positive connection of the segment sheets to profiled strips arranged on the stator support ring, in particular by radial fixing, to counteract sagging of the lamination stack relative to the stator support ring, especially in the 12 o'clock position.

The positive connection between the segment sheet and the strips can preferably be designed as a tongue and groove connection. The process of assembly is simplified by designing the positive connection as a tongue and groove connection and can easily be automated.

In particular, the at least two recesses can be formed on the ends of the segment sheet and each form a tangential nose-shaped projection which can be brought into positive engagement with a corresponding depression on the strips. In this context, tangential is understood to mean perpendicular to the radial sections of the segment sheet and thus perpendicular to a radial line related to the center of curvature of the segment sheets. For assembly, the tangential nose-shaped projection of the segment sheet can be brought into engagement with a corresponding depression of a first strip by insertion. The segment sheet can then be raised on one side, i.e., moved in the axial direction of the stator support ring. After this, the segment sheet raised on one side can be pivoted radially in the direction of the stator support ring until the segment sheet rests against the stator support ring. Following this, the segment sheet can be set down, wherein the oppositely formed tangential nose-shaped projection of the segment sheet can be brought into engagement with a corresponding depression of the following strip.

The strips can preferably be designed as extruded profiles which preferably consist at least partially of a light metal. The strips embodied as extruded profiles can be produced inexpensively. The profiled strips are preferably of symmetrical configuration.

According to a preferred embodiment, the strips can have a hollow-cylindrical section and a cuboidal section. The strip designed as an extruded profile can consist of a combination of a tube section and a rectangular profile, wherein the tube section can be used for the passage of a cooling medium.

For this purpose, the segment sheet can have a tangential semicircular recess at one end, the contour of which corresponds to the contour of the hollow-cylindrical section of the strip, and can have a tangential, substantially cuboidal recess at its other end, the contour of which corresponds to the contour of the cuboidal section of the strip. The tangential semicircular recess can form an undercut. The segment sheet can first be pushed onto the hollow-cylindrical section of the strip at a sloping angle to the stator support ring. The segment sheet can then be moved in the direction of the stator support ring by a radially directed movement until the segment sheet is resting in contact. The segment sheet can thereby be positively fixed in the tangential and radial directions.

According to a further embodiment, at least one radial recess, which has a substantially parallelogram-shaped contour, can be arranged in the third section, and the profiled strip has a dovetail cross section.

In this case, lamination rings formed from the segment sheets can be arranged one above the other in pairs to form a segment sheet arrangement, wherein a lower lamination ring is in each case formed from segment sheets whose at least one radial recess has an undercut in a first circumferential direction, and the upper lamination ring is formed from segment sheets whose at least one radial recess has an undercut in a second circumferential direction opposite to the first circumferential direction. The undercuts are preferably formed by shaping the radial recesses as non-orthogonal parallelograms, particularly preferably diamond-shaped or rhomboid-shaped parallelograms. Owing to the alternating arrangement of the segment sheets with radial recesses sloping in opposite directions one above the other, a trapezoidal connection, i.e., dovetail connection, can then be formed in combination, while at the same time maintaining the advantage of simple introduction of the individual segment sheets. Owing to the "one-sided" undercut or the parallelogram-like course of the recesses, these tilt only slightly or not at all. Fixing of the segment sheets in the radial and tangential directions can nevertheless be achieved. Within the respective recess of the segment sheet, a projection extending in the tangential direction can be provided on a wall section which delimits the recess in the radial direction, which projection serves to center the segment sheet with respect to the strip received by the recess.

According to another preferred embodiment, at least one radial recess, in which radially extending, elastically deformable holding sections are formed which have undercuts at their free end which can be brought into positive engagement with the strip, can be formed in the third section. The elastically deformable holding sections extending radially from the bottom of the recess can be pushed onto the strip when the segment sheet is moved in the direction of the stator support ring by a radially directed movement.

For this purpose, the strip fastened on the stator support ring can have a contour tapering in the radial direction, with the result that the holding sections are expanded in the tangential direction when pushed onto the strip. Grooves can be provided on the strip on the side facing the stator support ring, into which grooves the undercuts at the free ends of the holding sections can latch in a positive-locking manner. In this way, radial pressure of the segment sheets against the stator support ring can be brought about, thereby ensuring better heat dissipation.

It is advantageous if a receptacle is arranged centrally in a bottom which tangentially delimits the recess, wherein the contour of the receptacle corresponds to the contour of the free end of the strip. A section of the strip can be received by the receptacle. Improved centering of the segment sheet pushed onto the strip can thereby be achieved.

According to another preferred embodiment, at least one radial recess, in which tangentially extending, elastically or plastically deformable holding sections are formed which function as a type of toggle lever arrangement, can be formed in the third section. When pushed onto the profiled strip, the free ends of the holding sections can be brought into engagement in sections with corresponding depressions in the strip. As a result of the radially directed movement in the direction of the stator support ring, the holding sections which are brought into positive engagement when pushed onto the strip are taken along and moved past their dead center position. For this purpose, the holding sections can be articulated to the walls delimiting the radial recess by means of a plastic hinge.

The, in particular radial, fixing of the segment sheets due to the positive connection to the strips on the stator support ring is advantageous if, as a result of settling during operation, there is a decrease in the pressure of the segment sheets against one another. Radial migration of a segment sheet into the air gap, which occurs in isolated cases, being promoted by the magnetic pull of the poles, can thereby be avoided.

One embodiment has been explained above with reference to the segment sheet. In a further aspect, however, another embodiment relates to a stator lamination stack for a generator of a wind turbine. The the stator lamination stack has a plurality of segment sheets, wherein a plurality of segment sheets is arranged one against the other in a plane in such a way that they jointly form a lamination ring, and a plurality of segment sheets is stacked in the formed lamination rings in such a way that they jointly form the stator lamination stack, wherein the stator lamination stack has a first radial section, in which a plurality of grooves is provided for receiving a stator winding, wherein the grooves are formed by recesses provided in the segment sheets, a second radial section, which is arranged radially adjacent to the first section and which forms a segment of a magnetic yoke of the generator, and a third radial section, which is arranged radially adjacent to the second section, characterized in that the segment sheets are designed in accordance with one of the preferred embodiments described above, wherein the third radial section has at least two recesses arranged in an azimuthally spaced manner, which are designed for a positive connection to profiled strips arranged on a stator support ring.

In this case, the stator lamination stack can be arranged between two rings formed from lower pressure plate segments and upper pressure plate segments, wherein the lower pressure plate segments are arranged in a stationary manner on the stator support ring, and the upper pressure plate segments are movable in the axial direction of the stator support ring. Here, the lower pressure plate segments can be arranged in a circumferential groove in the stator support ring, as a result of which these are fixed in the axial direction of the stator support ring. Owing to the movability of the upper pressure plate segments in the axial direction of the stator support ring, it is possible to retighten the segment sheets of the stator lamination stack, which are subjected to a preload by clamping means such as, for example, stud bolts, threaded rods or the like. In particular, it is possible in this embodiment to dispense with the assembly step of welding.

Embodiments been described above with reference to the segment sheet and the stator lamination stack according to the first and second aspects of the invention. In a third aspect, another embodiment further relates to a generator of a wind turbine, in particular a multi-pole, slowly rotating synchronous ring generator.

Provided is a generator of the abovementioned type in that the generator of a wind turbine, in particular a slowly rotating synchronous ring generator, has a generator stator and a generator rotor mounted so as to be rotatable relative to the generator stator, wherein the generator stator has at least one stator lamination stack, in which a plurality of grooves is provided, in which a stator winding is accommodated, wherein the generator stator has a stator support ring, on which strips are arranged in the tangential direction, wherein at least one stator lamination stack is connected to the strips by means of a positive connection to the strips.

The at least one stator lamination stack is preferably designed in accordance with one of the preferred embodiments described above.

In a further aspect, yet another embodiment relates to a wind turbine. Provided is a wind turbine, in particular a gearless wind turbine, having a tower, a nacelle, which is arranged rotatably on the tower, a hub, which is mounted rotatably on the nacelle and has a number of rotor blades, and a generator for providing electrical energy, which has a generator rotor connected to the hub and a generator stator connected to the nacelle, by virtue of the fact that the generator is designed in accordance with one of the preferred embodiments described above.

BRIEF DESCRIPTION OF THE SEVERAL VIEWS OF THE DRAWINGS

The invention is described in greater detail below by means of exemplary embodiments with reference to the attached drawings. In the drawings.

DETAILED DESCRIPTION

In all the figures of the drawings, mutually corresponding parts are provided with the same reference signs.

Figure 1:
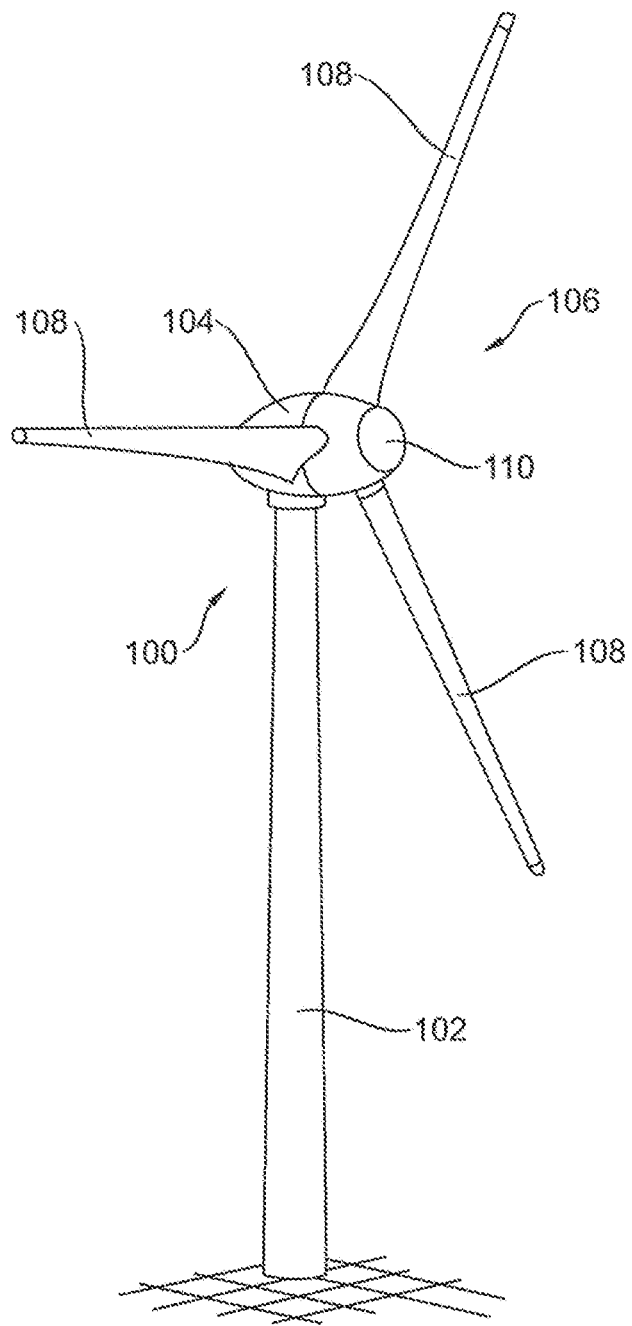
FIG. 1 shows a schematic perspective view of a wind turbine.

FIG. 1 shows a wind turbine 100 having a tower 102 and a nacelle 104. A rotor 106 with three rotor blades 108 and a spinner 110 is arranged on the nacelle 104. In operation, the rotor 106 is caused to rotate by the wind and thereby drives a generator 1 (FIG. 2) in the nacelle 104.

Figure 2:
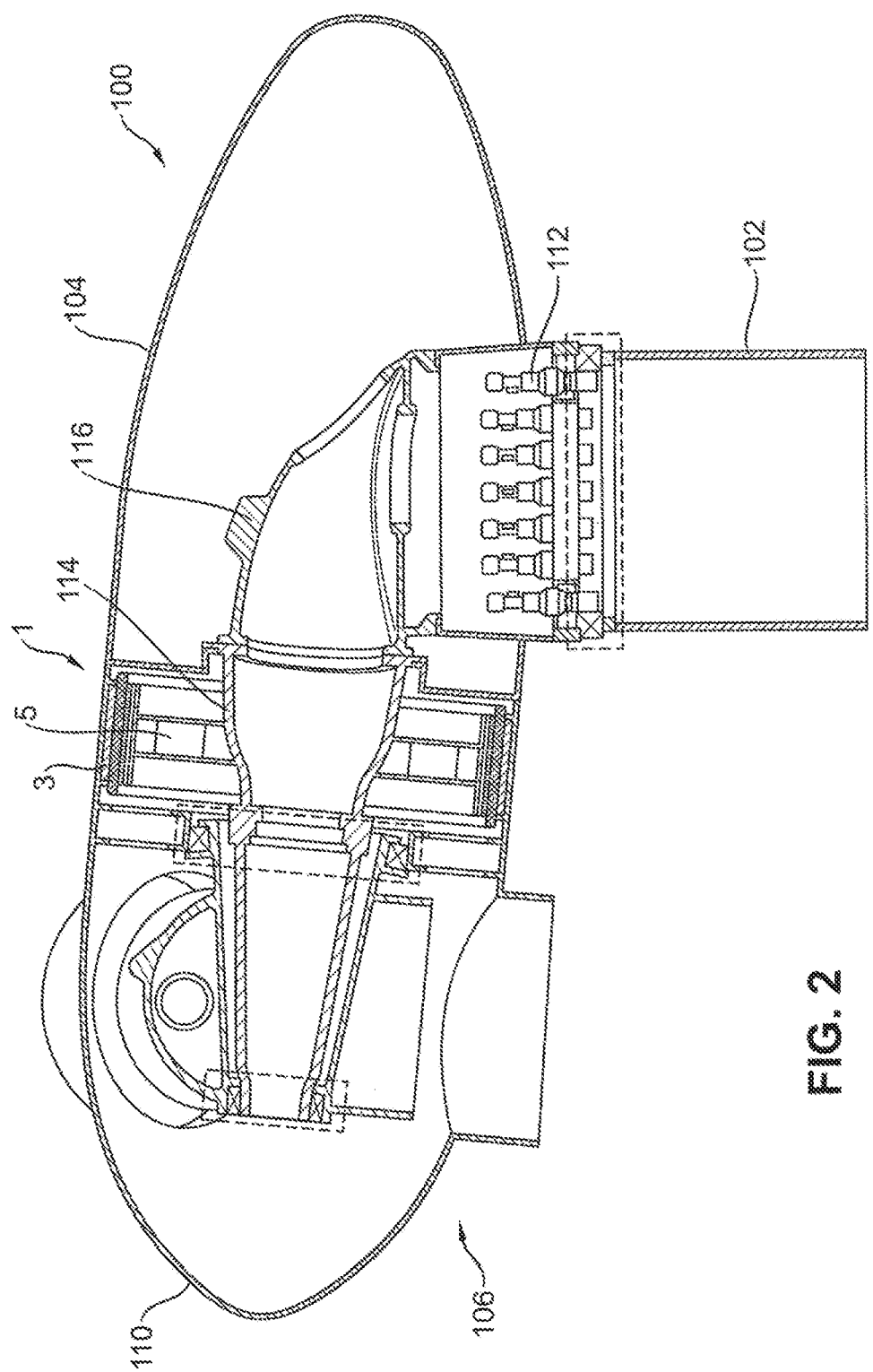
FIG. 2 shows a schematic partial sectional view of a nacelle of the wind turbine according to FIG. 1.

In FIG. 2, the nacelle 104 of the wind turbine 100 according to FIG. 1 is shown schematically in a partially sectioned view. The nacelle 104 is rotatably mounted on the tower 102 and driven by an azimuth drive 112 in a generally known manner. A machine carrier 116, which carries an axle journal 114, is likewise arranged in the nacelle 104 in a generally known manner.

The generator 1 has a generator stator 5 which is fastened on the machine carrier 116 in the nacelle 104 by means of the axle journal 114. Other possible embodiments not excluded by the invention provide, for example, for the generator stator 5 to be attached directly to the machine carrier 116 or to a corresponding component of the nacelle 104.

The generator 1 according to FIG. 2 has a generator rotor 3, which is designed as an external rotor. The rotary motion of the rotor 106 is transmitted to the generator rotor 3. Alternative possible embodiments not excluded from the scope of the invention also provide, for example, for a generator rotor designed as an internal rotor.

Figure 3B:
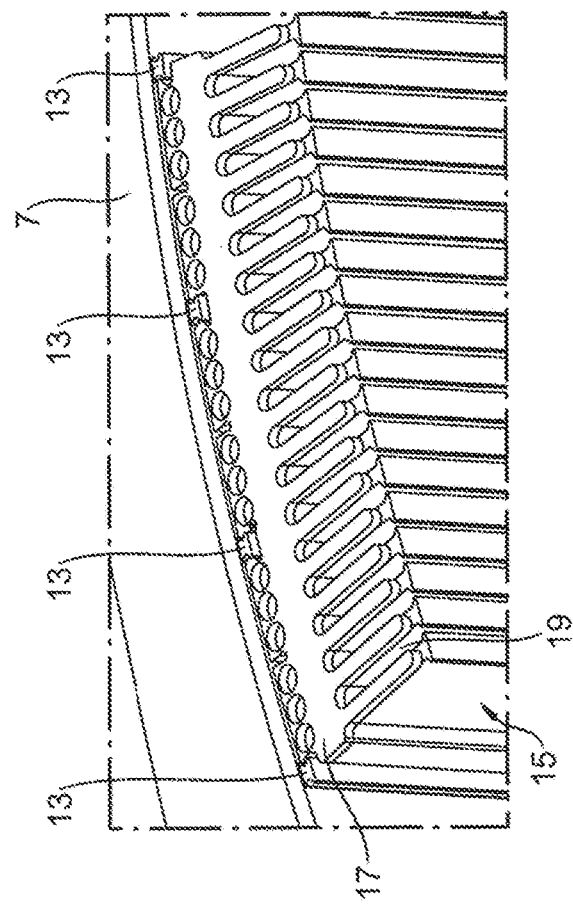
FIG. 3b shows a schematic illustration of the stator support ring according to FIG. 3a with an upper pressure plate segment arranged on the drive side.
Figure 3A:
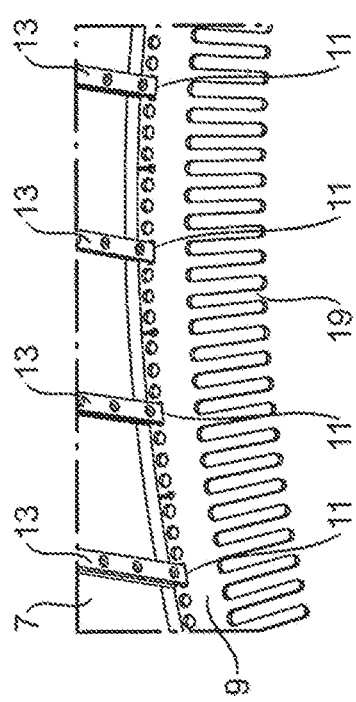
FIG. 3a shows a schematic illustration of a partial view of a stator support ring with a lower pressure plate segment arranged on the machine carrier side.

The generator rotor 3 is connected to the hub 106 for conjoint rotation therewith. The more detailed construction of the generator stator 5 is shown in FIGS. 3a and 3b. The generator 5 has a hollow-cylindrical stator ring 7. The generator rotor 3 runs outside the stator ring 7, being spaced apart from the latter by an annular gap. The stator ring 7 is fastened on a stator receptacle by means of two support rings. The stator receptacle is in turn screwed to the axle journal 114. Other ways of fastening the stator 5 on the machine carrier 116 are likewise within the scope of the invention. The support rings are comparatively thin-walled sheets which leave the load-bearing capacity and mechanical rigidity of the stator ring 7 substantially unaffected. Instead, the stator ring 7 is designed to be self-supporting.

Arranged in the stator support ring 7 is a plurality of plate-shaped segment sheets 21 (FIG. 4), which are lined up to form lamination rings and are stacked one on top of the other in such a way that at least one stator lamination stack 15 is produced.

FIG. 3a shows a schematic illustration of a partial view of the stator support ring 7 with a lower pressure plate segment 9 arranged on the machine carrier side. The pressure plate segment 9 is embodied in the form of a ring segment, i.e., it has a circular-arc-shaped course curved about a central axis. A plurality of lower pressure plate segments 9 is inserted into a circumferential groove in the stator support ring 7 and lined up to form a closed ring. Here, the width of the groove corresponds to the thickness of the lower pressure plate segments 9. The lower pressure plate segments 9 are produced with a minus tolerance, and therefore a gap is formed when they are inserted and lined up, which gap corresponds to the sum of the partial tolerances of the individual lower pressure plate segments 9. This makes it possible to insert the last lower pressure plate segment 9 between two adjacent lower pressure plate segments 9. After insertion of the last lower pressure plate segment 9, the distances between the lower pressure plate segments 9 are made uniform. The lower pressure plate segments 9 have radial recesses 11 arranged in an azimuthally spaced manner on their side facing the stator support ring 7. Fastened on the stator support ring 7 are strips 13, which are oriented vertically with respect to the pressure plate segments 9 and a section of which extends into the recesses 11.

FIG. 3b shows a schematic illustration of the stator support ring 7 according to FIG. 3a with an upper pressure plate segment 17 arranged on the drive side, i.e., on a side facing the rotor 106. A plurality of upper pressure plate segments 9 is lined up to form a ring. For this purpose, the upper pressure plate segments 17 are placed on the strips 13. For this purpose, the upper pressure plate segments 17 have radial recesses arranged azimuthally, which can be brought into positive engagement with the profiled strips 13. The upper pressure plate segments 17 can be constructed substantially identically to the lower pressure plate segments 9. The stator lamination stack 15 is located between the lower pressure plate segments 9 and the upper pressure plate segments 17. Both the lower pressure plate segments 9 and the upper pressure plate segments 17 have a plurality of corresponding radial recesses 19, which are adapted to receive a stator winding. While the lower pressure plate segments 9 arranged in the circumferential groove of the stator support ring 7 are fixed in the axial direction of the stator support ring 7, the upper pressure plate segments 17 are movable in the axial direction. The lower pressure plate segments 9 and the upper pressure plate segments 17 form a kind of fixed bearing/floating bearing arrangement, between which the stator lamination stack 15 is arranged.

Figure 4:
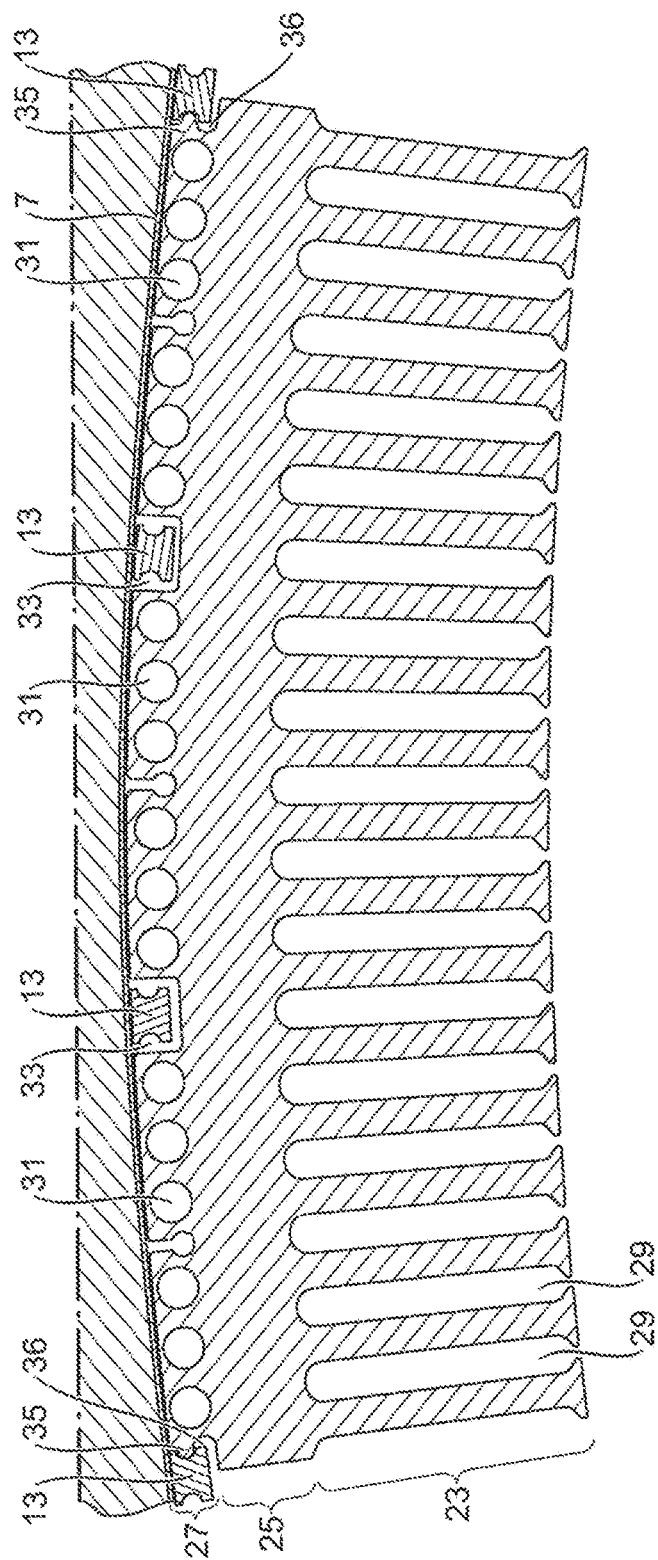
FIG. 4 shows a schematic illustration of a segment sheet, FIG. 5 schematically shows a strip in a perspective view (A) and a plan view (B), FIG. 6 schematically shows a partial view of the stator support ring according to FIG. 3a with a strip according to a second embodiment, wherein a segment sheet is in a position (C) applied to the strip and a position (D) applied to the stator support ring, FIG. 7 schematically shows a partial view of the stator support ring according to FIG. 3a with a strip and two segment sheets according to a third embodiment, the segment sheets being shown in an exploded view (C) and a position (D) applied to the stator support ring, FIG. 8 schematically shows a partial view of a segment sheet and a strip according to a further embodiment, which are arranged on the stator support ring, FIG. 9 schematically shows a partial view of the segment sheet according to FIG. 8 in a preferred development, FIG. 10 schematically shows a partial view of the segment sheet according to FIG. 9 in a preferred development, FIG. 11 schematically shows a partial view of a segment sheet and a strip according to a further preferred embodiment, in a position at a distance from the stator support ring, and FIG. 12 schematically shows a partial view of the segment sheet according to FIG. 11 in a preferred development.

The stator lamination stack 15 consists of a plurality of segment sheets 21, one of which is illustrated schematically in FIG. 4. The segment sheet 21 shown in FIG. 4 is embodied in the form of a ring segment, i.e., it has a circular-arc-shaped course curved about a central axis. Segment sheet 21 has a first radial section 23, in which a plurality of recesses 29 is made. The recesses 29 are adapted to receive a stator winding.

Adjacent to the first radial section 23, there is a second radial section 25, which forms a segment of the magnetic yoke of the generator stator 5. A third radial section 27 is located adjacent to the second radial section 25. The third radial section 27 has a plurality of through-openings 31, which serve for the passage of clamping means. The clamping means can be embodied, for example, as threaded rods, screws, tensioning cables and the like. Segment sheet 21 is provided in its third section 27 with at least one radial recess 33, which has a substantially U-shaped cross section. In the exemplary embodiment illustrated, two radial recesses 33 are made in the third section 27. The dimensions of the recesses 33 are selected in such a way that the respective strip 13 is enclosed by the recess 33 in a contactless manner.

In the tangential direction, the third section 27 has at each of its free ends a profiled projection 35, which projects into a radial recess 36 formed at the end. The respective projection 35 is of convex design. In particular, the projections 35 are of nose-shaped design. In the assembled position, the projections 35 are in positive engagement with the strips 13, between which the respective segment sheet 21 is mounted. For this purpose, the strips 13 have arcuate depressions 37, which have a shape and dimensions corresponding to the projections 35.

Figure 5:
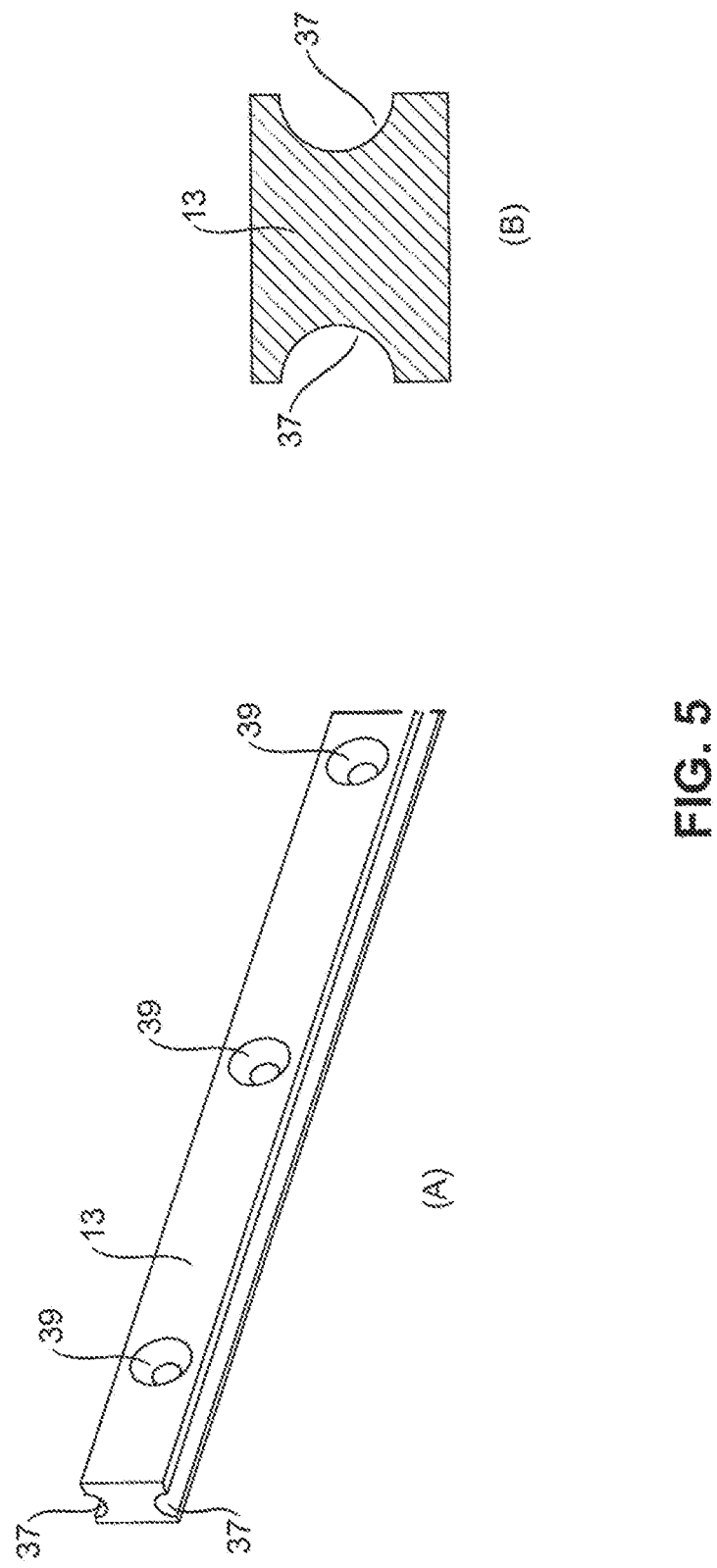

FIG. 5 schematically shows a strip 13 in a perspective partial view (A) and a plan view (B). The strip 13 is provided at intervals, in particular equidistant intervals, with through-holes 39, which serve to receive screws or the like for fastening the strip 13 on the stator support ring 7. As can be seen from view (B), the strip 13 is embodied on both sides with arcuate depressions 37. The arcuate depressions extend tangentially to the stator support ring 7. The respective projections 35 of mutually facing segment sheets 21 engage positively into the respective arcuate depression 37. The strips 13 preferably consist of a light metal or a light metal alloy, in particular aluminum or the like. The strips 13 are preferably embodied as extruded profiles.

For the construction of the stator lamination stack 15, the segment sheets 21 are lined up to form a closed lamination ring. The arrangement of the segment sheets 21 in the clockwise direction is described below. Owing to the symmetry of the segment sheets 21 and of the strips 13, the arrangement of the segment sheets 21 can be carried out in an analogous manner in the counterclockwise direction.

In a first assembly step, the respective segment sheet 21 of the lamination ring is inserted with one of its nose-shaped projections 35 into the arcuate depression 37 of a strip 13 which faces a strip 13 adjacent in the clockwise direction. In this case, the tangential projection 35 is held radially spaced apart from the stator support ring 7 at the opposite end of the segment sheet 21. In a second assembly step, the segment sheet 21 is raised, i.e., moved in the axial direction, at its freely movable end, which is not in engagement with the strip 13, and therefore the segment sheet 21 can then be pivoted without collision in the direction of the stator support ring 7 and the adjacent strip 13, viewed in the clockwise direction. Finally, in a third assembly step, the segment sheet 21 is set down, wherein the projection 35 is simultaneously brought into positive engagement with the arcuate depression 37 of the strip 13 that is adjacent in the clockwise direction.

After the first lamination ring of segment sheets 21 has been inserted between the strips 13, a second lamination ring is built up on the first lamination ring in the same way by the insertion of the segment sheets 21 between the strips 13. In this process, the arrangement of the segment sheets 21 is performed with an offset of one strip spacing with respect to the segment sheets 21 of the first lamination ring. A strip spacing preferably corresponds to an offset of approximately 5°. A third lamination ring is built up on the second lamination ring by the insertion of the segment sheets 21 with an offset of two strip spacings with respect to the first lamination ring. The arrangement of the segment sheets 21 of a fourth lamination ring again corresponds to the first lamination ring, and thus has no offset. This alternating layering is continued until the desired height of the stator lamination stack 15 is reached. Finally, the upper pressure plate segments 17 are placed on the uppermost layer of the segment sheets 21 of the stator lamination stack 15 and screwed and preloaded by means of stud bolts, which can be passed through the through-openings 31 in the segment sheets 21. Owing to the axial movability of the upper pressure plate segments 17, they can follow the preloading of the stud bolts. Subsequent retightening of the stud bolts in order to counteract a decrease in the pressure caused by settling of the segment sheets 21 during operation of the generator 1 has a direct effect on compression of the segment sheets 21.

Figure 6:
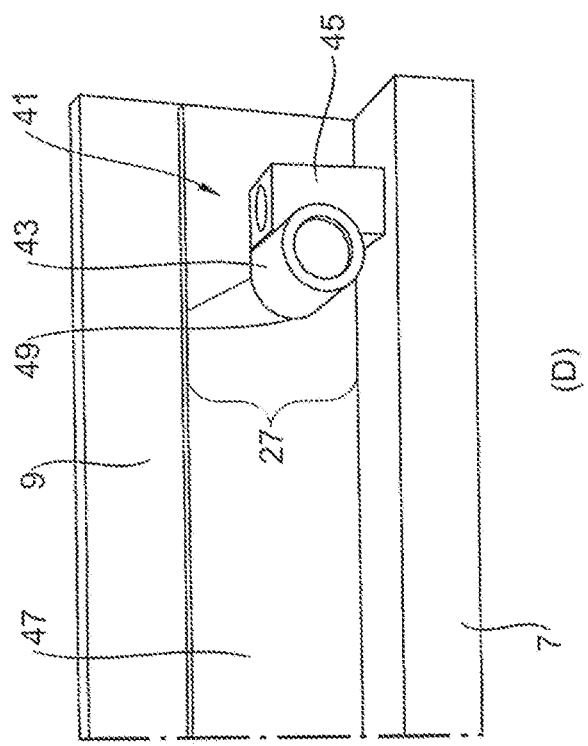
Figure 6:
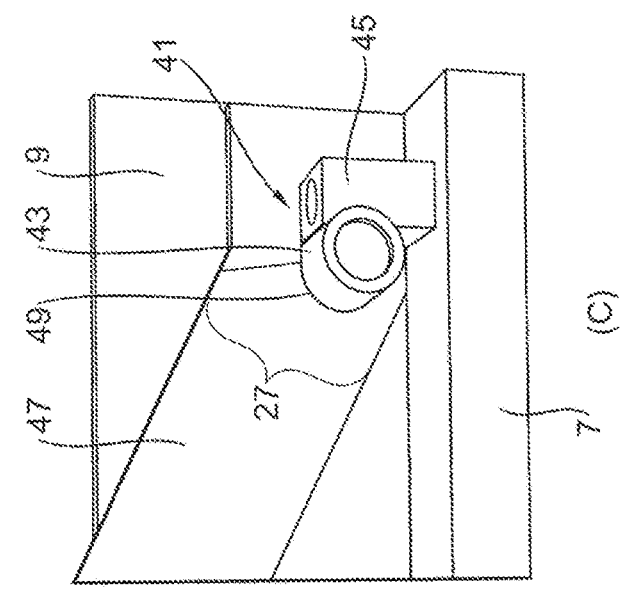

FIG. 6 schematically shows a partial view of the stator support ring 7 according to FIG. 3a with a strip 41 according to a second embodiment, wherein a segment sheet 47, of which only the first section 27 is illustrated, is in a position (C) applied to the strip 41 and a position (D) applied to the stator support ring 7. The strip 41 embodied as an extruded profile comprises a hollow-cylindrical or tubular section 43 and a cuboidal section 45. The hollow-cylindrical section 43 can be used within the stator 5 for cooling purposes. For this purpose, a preferably liquid cooling medium can be passed through the hollow cylindrical section 43 of the strip 41 arranged on the stator support ring 7. For positive connection of the segment sheet 47 to the strip 41, the segment sheet 47 has a tangential semicircular recess 49, the radius of which corresponds to the outer radius of the hollow cylindrical section 43. The segment sheet 47 is applied at an angle to the circumferential surface of the stator support ring 7 and then pivoted in its direction until the segment sheet 47 rests against the circumferential surface of the stator support ring 7. Mutually corresponding positive-locking elements, which in the applied position of the segment sheets bring about fixing to one another, are preferably formed on opposite sides of the segment sheets 47. A recess corresponding to the contour of the cuboidal section 45 can be formed at the opposite end of the segment sheet 47 from the semicircular recess 49. The insertion of the segment sheet 47 takes place analogously to the procedure described further above.

Figure 7:
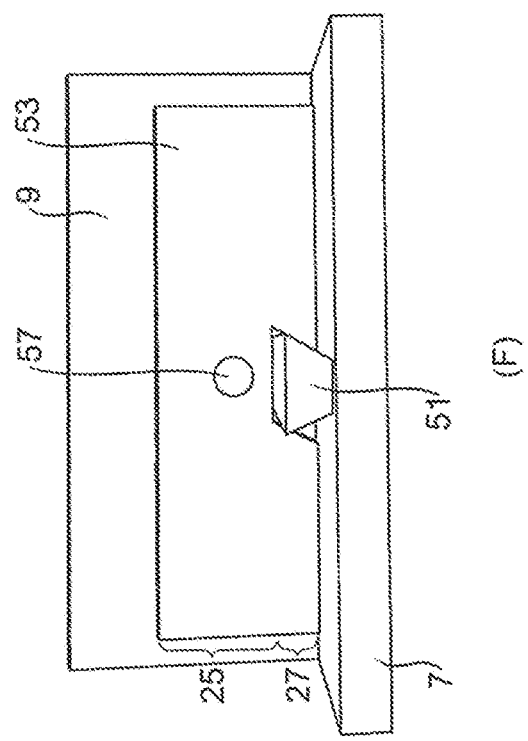
Figure 7:
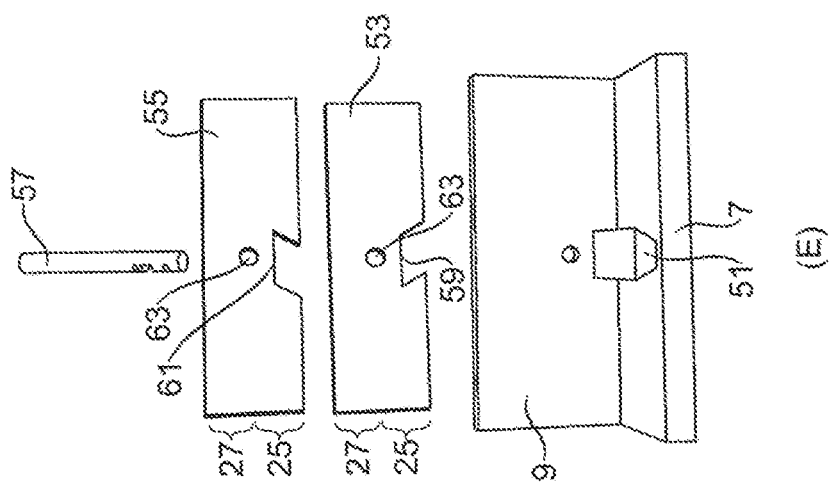

FIG. 7 schematically shows a partial view of the stator support ring 7 according to FIG. 3a with a strip 51 and a partial view of two segment sheets 53, 55 according to a third embodiment, the segment sheets 53, 55 being shown in an exploded view (C) and a position (D) applied to the stator support ring 7. The profiled strip 51 has a trapezoidal cross section which tapers toward the stator support ring 7. Segment sheet 53 and segment sheet 55 have in their respective third section 27 at least one recess 59 or 61, the contour of which corresponds substantially to the shape of a parallelogram. The at least one parallelogram-shaped recess 59 of segment sheet 53 slopes to the left in the exemplary embodiment shown, while the parallelogram-shaped recess 61 of segment sheet 55 slopes in the opposite direction to the right. At least one through-hole 63, which serves to receive a threaded rod 57 or a comparable clamping means, is arranged in each case in the respective second section of the segment sheets 53 and 55.

The view (F) according to FIG. 7 shows the segment sheets 53, 55, arranged in pairs one above the other, in their position applied to the stator support ring 7. The parallelogram-shaped embodiment of the at least one recess 59 or 61 makes it possible to push the segment sheet 53 or 55 onto the strip 51 on the stator support ring 7 by a substantially radially directed movement. During this process, the respective oppositely oriented undercut of the recess 59 or 61 is brought into positive engagement with a section of the strip 51. In the exemplary embodiment illustrated in FIG. 7, segment sheet 53 is arranged below segment sheet 55. A reverse arrangement is also conceivable.

For fixing the segment sheets 53 and 55 arranged in pairs relative to one another and with respect to the strip 51, the threaded rod 57 is introduced into the through-hole 63 in the segment sheets 53, 55. The stator lamination stack 15 is constructed in a manner analogous to that already described above. For the construction of the stator lamination stack 15, the segment sheets 53 and 55 are in each case lined up to form one of the lamination rings. In contrast to the embodiment of the segment sheet 21 described further above, only segment sheets 53 or only segment sheets 55 are alternately used for the respective lamination ring. Owing to the alternating arrangement of the segment sheets 53 and 55 on top of one another, which have the oppositely oriented undercuts on the recesses 59 or 61, a kind of dovetail connection is formed with the strip 51.

Figure 8:
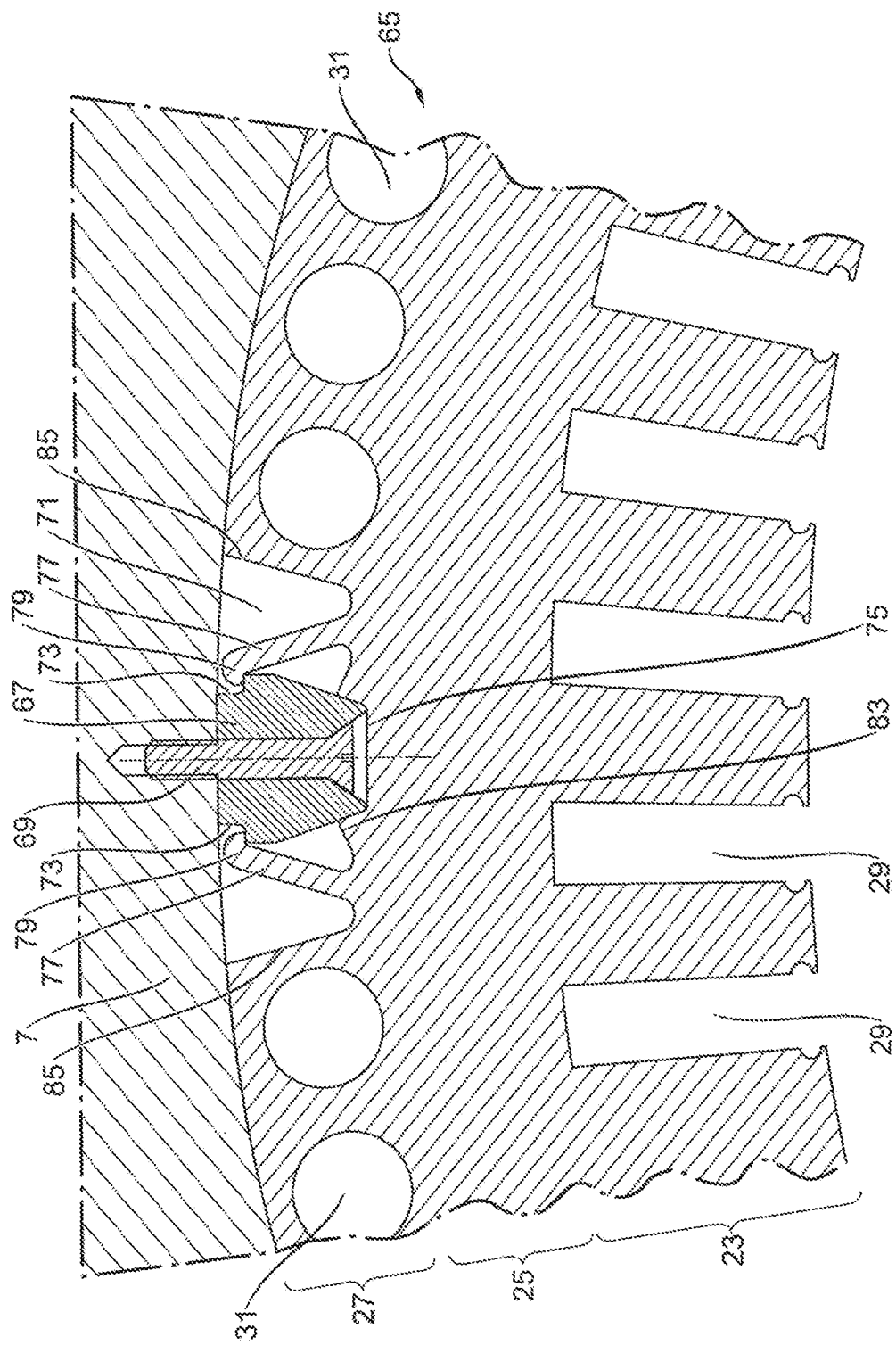

FIG. 8 schematically shows a partial view of a segment sheet 65 and a strip 67 according to a further embodiment, which are arranged on the stator support ring 7. The strip 67 is detachably fastened on the stator support ring 7 by means of a screw connection 69. The construction of the first section 23 and the second section 25 does not differ from the construction of the embodiment of the segment sheet 21 described further above. The third radial section 27 has a plurality of through-openings 31, which serve for the passage of clamping means. At preferably equidistant intervals, at least two radial recesses 71 are arranged in the third section 27, which recesses are open on their side facing the stator support ring 7. One such recess 71 is shown in FIG. 8.

The strip 67 has a substantially trapezoidal cross section. Grooves 73 are provided on both sides in the base region of the strip 67, with which the strip 67 bears against the stator support ring 7.

The upwardly open recess 71 is delimited radially by walls 85 and tangentially by a bottom 83. The recess 71 has in its bottom 83 a receptacle 75 corresponding to the contour of the free end of the strip 67. The receptacle 75 is arranged centrally in the recess 71. A section of the free end of the strip 67 penetrates into the receptacle 75. Adjacent to the receptacle 75, two elastically deformable holding sections 77 are formed in the third section 27, which extend radially starting from the bottom 83 of the recess 71. The holding sections 77 are formed by punching out. The two holding sections 77 are each arranged so as to slope at an angle to the bottom 83 of the recess 71 and delimit an opening. At the ends of the holding sections 77, they each have a tangential shoulder 79, which engages in the respective groove 73 on the strip 67.

For arrangement on the stator support ring 7, the segment sheet 65 is aligned with respect to the strips 67, with the result that the holding sections 77 are positioned substantially opposite the strips 67. By moving in the radial direction toward the stator support ring 7, the strips 67 are introduced through the opening between the holding sections 77. During this process, the elastically deformable holding sections 77 are pressed apart laterally on account of the trapezoidal shape of the strip 67. At the latest when the strip 67 is resting in the receptacle 75 against the bottom of the recess 71, the shoulders 79 on the holding sections 77 are located at the level of the respective groove 73, into which the shoulders 79 engage in a positive-locking manner on account of the restoring force. The receptacle 75 at the bottom 83 of the recess 71 and the two holding sections 77 effect a centering and latching function during the mounting of the segment sheet 65.

Figure 9:
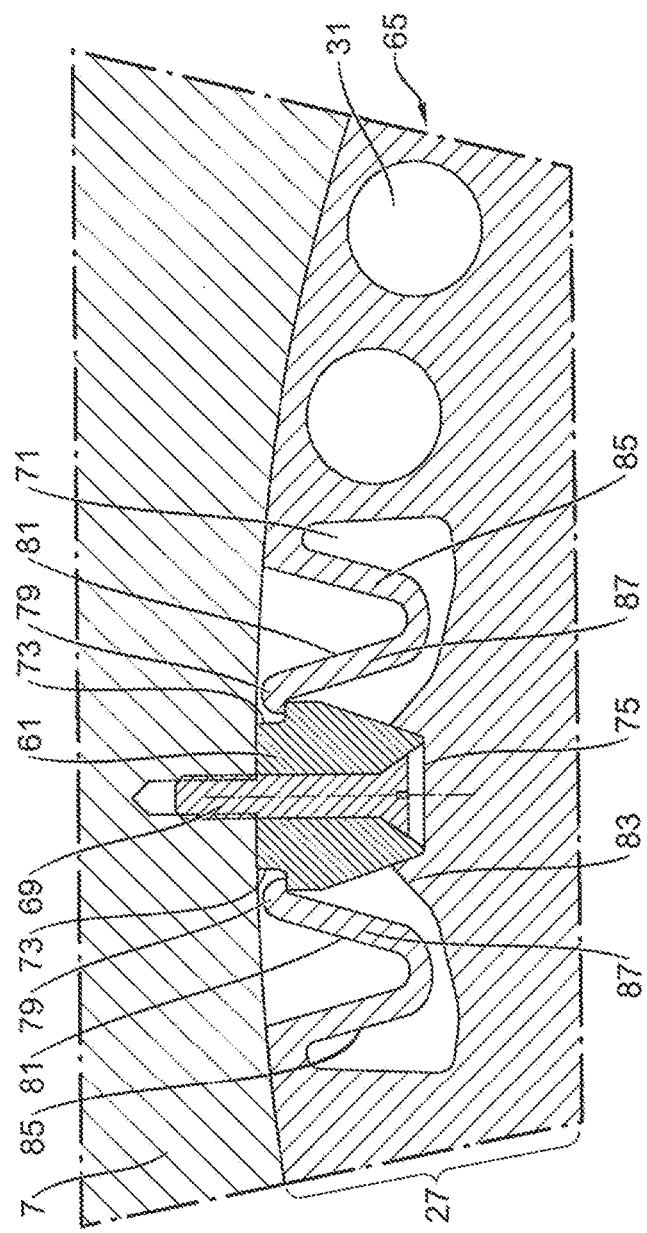

FIG. 9 schematically shows a partial view of the segment sheet 65 according to FIG. 8 in a preferred development. In contrast to the configuration of the elastically deformable holding sections 77 according to FIG. 8, mutually opposite elastically deformable holding sections 81 which start from wall sections 85 that laterally delimit the recess 71 and a section of which extends in the tangential direction of the recess 71 are formed in the recess 71 in the third section 27. The two holding sections 81 have a substantially U-shaped course. At the outer end of mutually facing legs 87 of the holding sections 81, which delimit the feed opening for the strip 67, a shoulder 79 is arranged in each case, which engages in the respective groove 73 on the strip 67.

Figure 10:
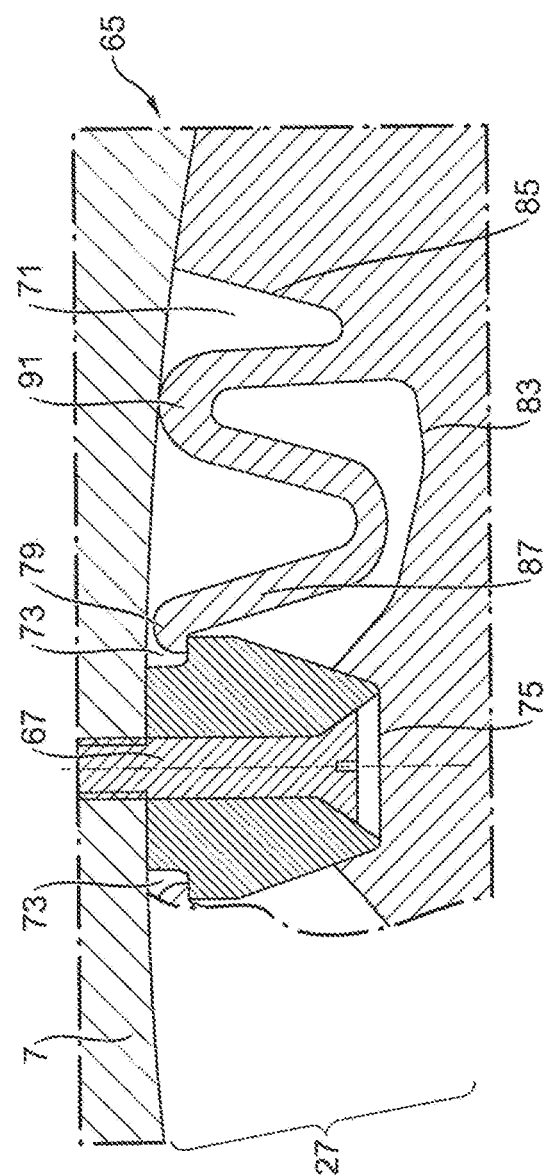

FIG. 10 schematically shows a partial view of the segment sheet 65 according to FIG. 9 in a preferred development. According to this development, two mutually opposite, elastically deformable holding sections 91, which have a substantially S-shaped course, are arranged in the respective recess 71. The receptacle 75 at the bottom 83 of the recess 71 and the two holding sections 81 and 91 effect a centering and latching function during the mounting of the segment sheet 65.

Figure 11:
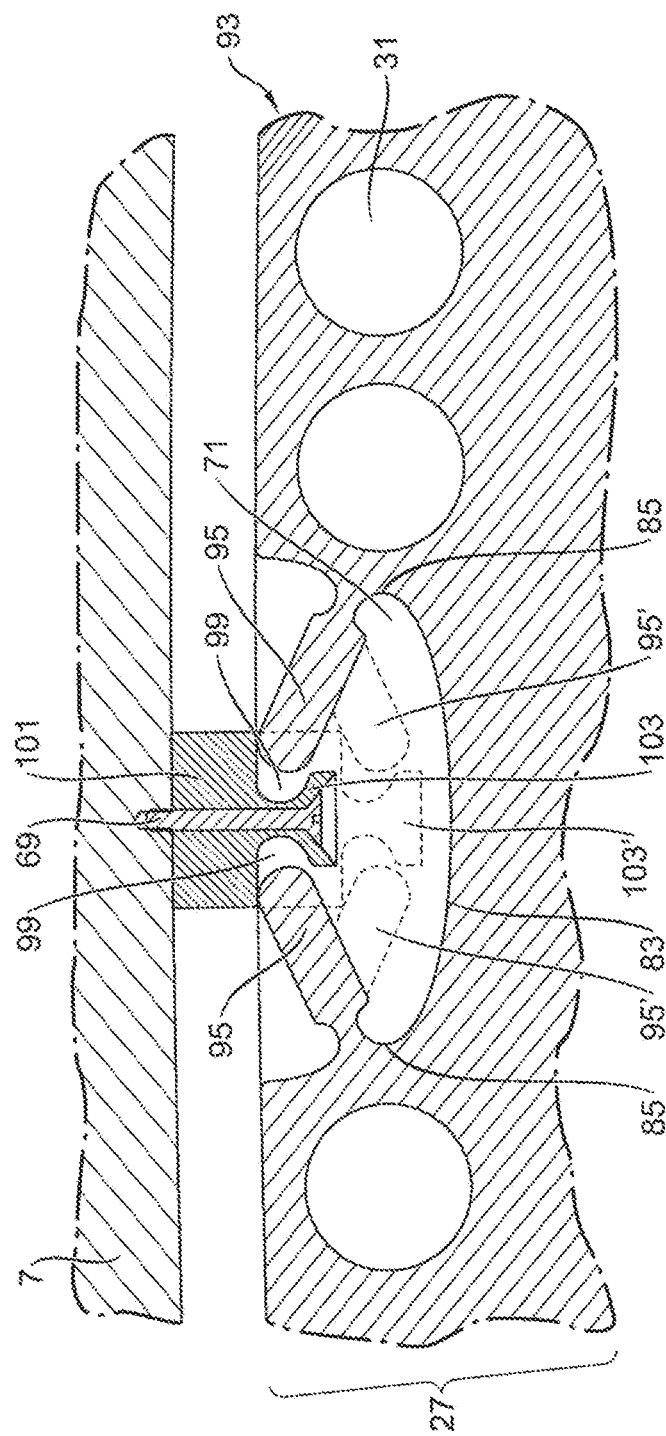

FIG. 11 schematically shows a partial view of a segment sheet 93 and a strip 97 according to a further preferred embodiment, in a position at a distance from the stator support ring 7. The strip 97 is of profiled design at its free end. A base section 101 with a cuboidal cross section merges into an end section 103 of narrower width. Between the base section 101 and the end section 103, depressions 99 that have a curved course or are arcuate are formed on both sides of the strip 97. A section of holding sections 95 formed on the walls 85 of the recess 71 of the segment sheet 93 engages in these depressions 99, and the holding sections are supported on the base section 101. The two holding sections 95 are plastically or elastically deformable.

Figure 12:
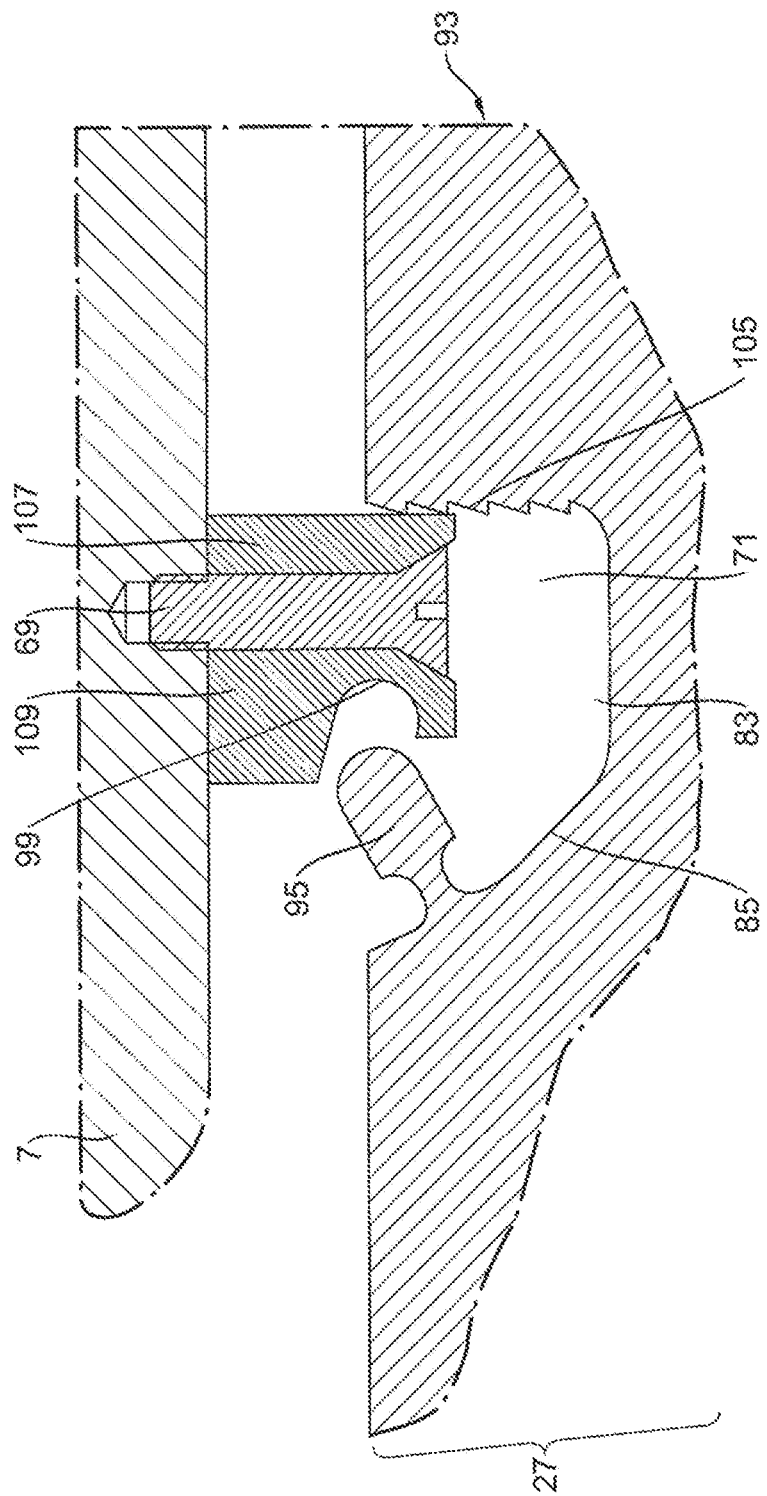

The segment sheet 93 is pressed against the stator support ring 7 by a radially directed movement relative to the stator support ring 7. As indicated by the dashed line illustration of the position of end section 103' and holding sections 95', these are moved in the direction of the bottom 83 of the recess 71 during this process. The holding sections 95' reach their end position by being taken along by the base section 101. The configuration of the holding sections 95 and of the strip 97 are selected in such a way that a type of toggle lever arrangement is achieved, by means of which the segment sheet 93 is fixed radially and tangentially on the stator support ring 7. Here, the holding sections 95 are designed as toggle levers, which are moved beyond their dead center position owing to the radially directed movement of the segment sheet 93 toward the stator support ring 7, thus giving rise to a locking effect between the holding sections 95 and the strip 97. FIG. 12 schematically shows a partial view of the segment sheet 93 according to FIG. 9 in a preferred development. The segment sheet 93 is illustrated at a distance from the stator support ring 7. A strip 107 is detachably fastened on the stator support ring 7 by means of the screw connection 69. The profile of strip 107 differs from the profile of strip 97, which is illustrated in FIG. 11, by an asymmetrical configuration. In the base section 109 of the strip 107, a depression 99 which has a curved course or is arcuate is formed only on one side. A section of the holding section 95 formed on the wall 85 of the recess 71 engages positively in this depression 99. The holding section 95 is moved beyond its dead center position by the radially directed movement relative to the stator support ring 7. On the side facing away from the depression 99, the base section 109 has no change in the profile shape. On the other hand, the recess 71 has a wall which is provided with toothing 105 and which is opposite that of the wall 85.

The toothing 105 is brought into engagement with the surface of the base section 109 facing it. The holding section 95 functioning like a toggle lever cooperates with the toothing 105 to fix the segment sheet 93 resting against the stator support ring 7 tangentially and radially.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A segment sheet for a stator lamination stack of a generator of a wind turbine comprising:
a body in a shape of a ring segment, the body having:
a first radial section having a plurality of recesses configured to receive a stator winding,
a second radial section arranged radially adjacent to the first radial section, and forms a segment of a magnetic yoke of the generator, and
a third radial section arranged radially adjacent to the second section, wherein the third radial section has at least two recesses arranged in an azimuthally spaced manner, wherein the at least two recesses are designed for a positive connection to profiled strips arranged on a stator support ring,
wherein at least one radial recess having a substantially parallelogram-shaped contour is arranged in the third section, and wherein each of the profiled strip has a dovetail shape in cross section.

2. The segment sheet as claimed in claim 1, wherein the positive connection between the segment sheet and the profiled strips is a tongue and groove connection.

3. The segment sheet as claimed in claim 1, wherein the plurality of recesses are formed on the ends of the segment sheet, and each recess of the plurality of recesses form a tangential nose-shaped projection that is configured to be brought into positive engagement with a corresponding depression on the profiled strips.

4. The segment sheet as claimed in claim 1, wherein the profiled strips have extruded profiles and at least partially include a metal material.

5. The segment sheet as claimed in claim 1, wherein the profiled strips have a hollow-cylindrical section and a cuboidal section.

6. The segment sheet as claimed in claim 5, wherein the segment sheet has a tangential semicircular recess at a first end, wherein a contour of the tangential semicircular recess corresponds to a contour of the hollow-cylindrical section, and has a tangential, substantially cuboidal recess at a second end, a contour of the tangential, substantially cuboidal recess corresponds to the contour of the cuboidal section of the profiled strip.

7. The segment sheet as claimed in claim 1, wherein at least one radial recess is formed in the third section, wherein tangentially extending, elastically and/or plastically deformable toggle-lever holding sections are formed in the at least one radial recess.

8. A segment sheet arrangement comprising:
a plurality of segment sheets as claimed in claim 1, wherein a plurality of lamination rings formed from the plurality of segment sheets are arranged one above the other in pairs, wherein a lower lamination ring is in each case formed from segment sheets such that the respective at least one radial recess has a slope in a tangential direction, and wherein the upper lamination ring is formed from segment sheets such that the respective at least one radial recess has an opposite slope in the tangential direction.

9. A segment sheet for a stator lamination stack of a generator of a wind turbine comprising:
  a body in a shape of a ring segment, the body having:
    a first radial section having a plurality of recesses configured to receive a stator winding,
    a second radial section arranged radially adjacent to the first radial section, and forms a segment of a magnetic yoke of the generator, and
    a third radial section arranged radially adjacent to the second section, wherein the third radial section has at least two recesses arranged in an azimuthally spaced manner, wherein the at least two recesses are designed for a positive connection to profiled strips arranged on a stator support ring,
    wherein the third section has at least one radial recess, wherein radially extending, elastically deformable holding sections are formed in the at least one radial recess and have undercuts at their distal ends, wherein the radially extending, elastically deformable holding sections are configured to positively engage with the profiled strip.

10. The segment sheet as claimed in claim 9, wherein a receptacle is arranged centrally in a bottom which tangentially delimits the recess, wherein a contour of the receptacle corresponds to a contour of a distal end of the profiled strip.

11. A stator lamination stack for a generator of a wind turbine, comprising:
  a plurality of segment sheets of claim 1 arranged stacked relative to one another in a plane to form a lamination ring, and
  a plurality of lamination rings stacked to form the stator lamination stack,
  wherein the stator lamination stack has the first radial section having a plurality of grooves configured to receive a stator winding, wherein the plurality of grooves are formed by the plurality of recesses in the segment sheets,
  wherein the stator lamination stack has the second radial section arranged radially adjacent to the first section and forms the segment of the magnetic yoke of the generator, and
  wherein the stator lamination stack has the third radial section arranged radially adjacent to the second section, wherein the third radial section has the at least two recesses arranged in an azimuthally spaced manner, wherein the at least two recesses are designed for-a the positive connection to profiled strips arranged on the stator support ring.

12. The stator lamination stack as claimed in claim 11, wherein the stator lamination stack is arranged between two rings formed from lower pressure plate segments and upper pressure plate segments, wherein the lower pressure plate segments are arranged in a stationary manner on the stator support ring, and wherein the upper pressure plate segments are movable in an axial direction of the stator support ring.

13. A generator of a wind turbine comprising:
  a generator stator, and
  a generator rotor mounted relative to the generator stator and configured to rotate relative to the generator stator, wherein the generator stator has at least one stator lamination stack as claimed in claim 11.

14. The generator as claimed in claim 13, wherein the plurality of grooves are at a first radial section of the at least one stator lamination stack.

15. A wind turbine comprising:
  a tower,
  a nacelle coupled to the tower and configured to rotate relative to the tower,
  a hub coupled to the nacelle and configured to rotate relative to the nacelle,
  a number a plurality of rotor blades coupled to the hub, and
  a generator configured to generate electrical energy, wherein the generator is the generator as claimed in claim 13, wherein the generator rotor is connected to the hub and the generator stator is connected to the nacelle.

16. The wind turbine as claimed in claim 15, wherein the wind turbine is a gearless wind turbine.

17. The generator as claimed in claim 13, wherein the at least one stator lamination stack has a second radial section arranged radially adjacent to the first radial section, and forms a segment of a magnetic yoke of the generator.

18. The generator as claimed in claim 13, wherein the at least one stator lamination stack has a third radial section arranged radially adjacent to the second section, wherein the third radial section has at least two recesses arranged in an azimuthally spaced manner, wherein the at least two recesses are designed for a positive connection to profiled strips arranged on a stator support ring.

* * * * *